Aug. 25, 1936.   H. M. LEWIS   2,052,184
ELECTRIC WAVE GENERATOR
Filed Feb. 9, 1935    2 Sheets-Sheet 1

INVENTOR
HAROLD M. LEWIS
BY
Pennie, Davis, Marvin and Edmonds
ATTORNEYS

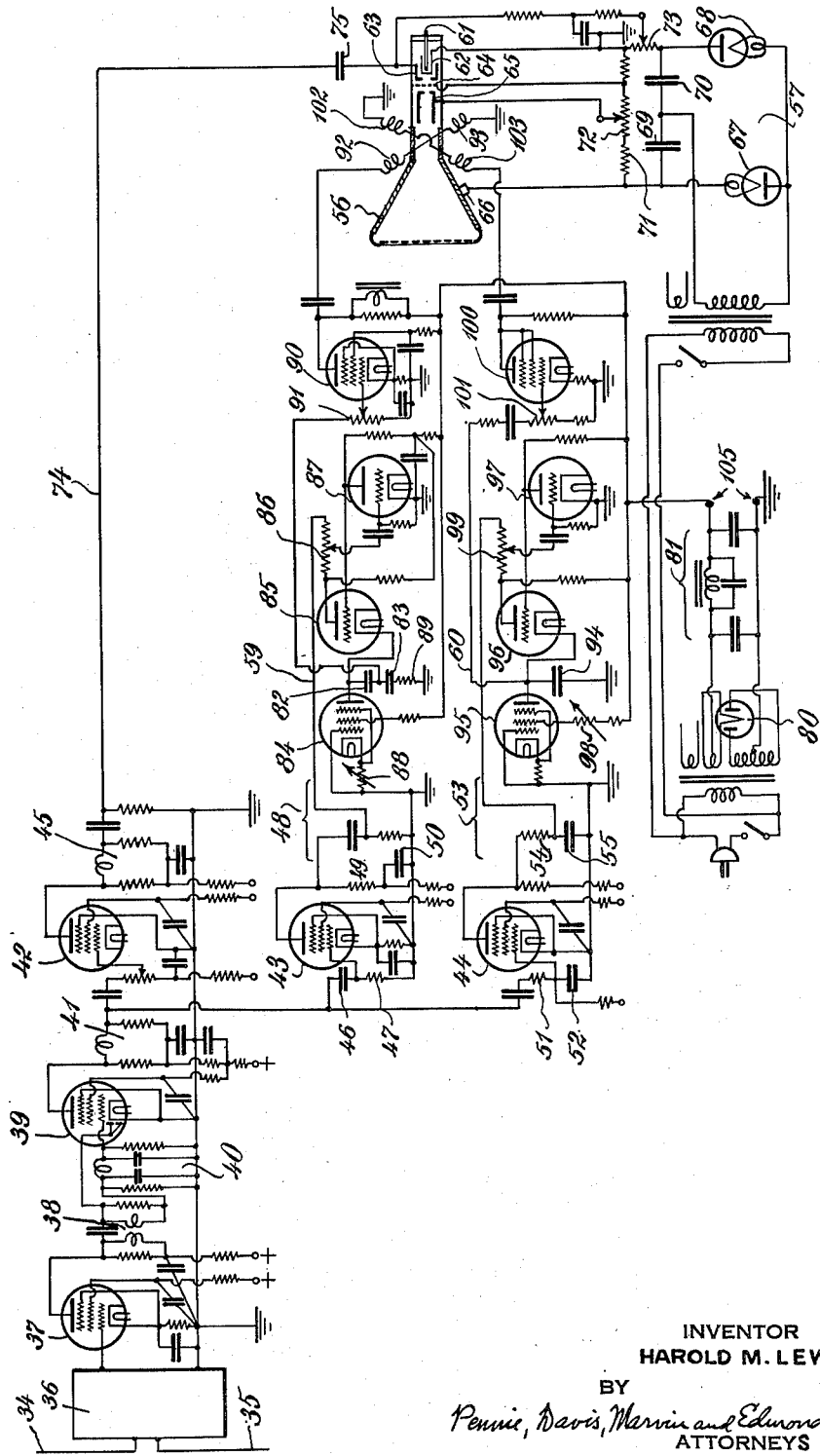

Patented Aug. 25, 1936

2,052,184

UNITED STATES PATENT OFFICE 2,052,184

ELECTRIC WAVE GENERATOR

Harold M. Lewis, Douglaston, N. Y., assignor to Hazeltine Corporation, a corporation of Delaware Application February 9, 1935, Serial No. 5,781

12 Claims. (Cl. 250—36)

This invention relates to apparatus for the production of electrical waves of complex wave form and more particularly of "saw-tooth" and related wave forms. The invention further relates to the utilization of the electrical waves thus generated to deflect a scanning beam for scanning in a television system, and to the synchronized control by means of television signals of the wave generating apparatus.

A primary object of the invention is to provide a wave form generator of the character referred to which, although self-sustaining in operation, may be readily controlled by a synchronizing voltage supplied from an external source.

A particular object of the invention resides in the utilization of such a generator in a cathode ray tube television receiving system to deflect the cathode ray appropriately for scanning under control of synchronizing impulses derived from received television signals.

Another object of the invention is to provide a generator of sinusoidal or of complex wave form which is readily controlled by a synchronizing wave to set the generated frequency at that of the synchronizing wave or at an integrally related frequency, as the service demanded of the generator may require.

The electric wave generator of complex wave form, according to the invention, employs a condenser adapted to be charged at a substantially constant and relatively low rate from a direct voltage source in series with a high resistance or the space path of a space discharge device, such as a vacuum tube, arranged to provide a practically constant charging current throughout the range of voltage variation to which the device is subjected by the generated wave.

The condenser as thus charged is periodically discharged at a relatively high rate through the space path of a first grid controlled space discharge tube, such as a vacuum tube. This result is secured by coupling the output of the first tube to the input of a second grid controlled vacuum tube, and by further coupling the output of this second tube regeneratively to the input or grid circuit of the first tube, i. e., in such manner that the grid potentials of the first and second tubes are varied oppositely by variation in space current of the first tube.

Thus, as the condenser charges up in the manner aforesaid, the resulting voltage increase across its terminals is effectively applied between cathode and plate of the first tube and in such manner that, at a predetermined voltage, space current will start to flow in the plate-cathode path of the first tube to discharge the condenser. The condenser in thus discharging, reverses the grid potential swing of the second tube thus causing the second tube to swing the grid potential of the first tube increasingly positive and thereby accelerates the discharge of the condenser by the first vacuum tube.

In application Serial No. 747,068, filed October 5th, 1934, in the names of myself and Madison Cawein as joint inventors, there is described electric wave generators of the general type above referred to, and there is disclosed in said application the incorporation of such generators in cathode ray tube television receiving apparatus to deflect the cathode ray beam of said tube for television scanning. And it is further pointed out in said application that the receiving apparatus scanning wave generators may be maintained in synchronism with the scanning apparatus at the transmitting station, by causing the transmitting apparatus to transmit suitable synchronizing impulses along with the vision frequency signals by modulation of a carrier wave, which syncronizing impulses are, upon demodulation of the carrier wave at the receiving station, appropriately applied to the scanning wave generators thereat for the purpose of maintaining synchronism. In my application Ser. No. 747,070, filed October 5, 1934, I have further disclosed a form of television transmitting apparatus for generating and emitting the mentioned synchronizing impulses.

The scanning wave generators of the present invention incorporate improvements over those of the mentioned application Serial No. 747,068, one of which, featuring the present invention, resides in an adjustable potentiometric arrangement for so applying a synchronizing voltage to a scanning wave generator as to provide a smooth and continuously adjustable control simultaneously regulating oppositely both the amplitude of synchronizing voltage applied to the generator and the amplitude of the feedback voltage. This control adjustment is such, for example, that as the synchronizing voltage applied to a generator is increased in amplitude, the feedback voltage is simultaneously decreased in amplitude. In this way the generator may be precisely adjusted to maintain the generated wave in synchronism with the synchronizing wave at the same frequency or at integrally related frequencies. This novel form of control is not limited in its application to oscillation generators of complex wave form but may be applied to other oscillation generators employing feedback.

Having now described my invention generally, reference will be had for a detailed explanation to the accompanying drawings wherein:

Fig. 4 is the circuit diagram of a cathode ray tube television receiving system wherein scanning deflection of the cathode ray beam is secured by means of the improved "saw-tooth" wave generators of this invention.

Figure 1:
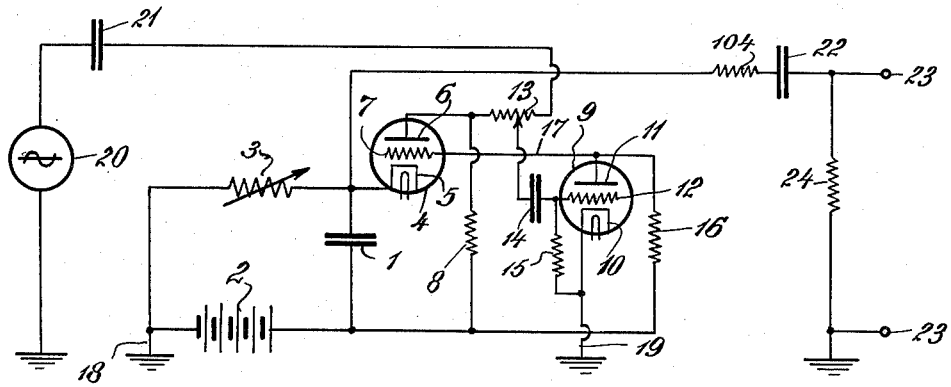
Figs. 1 and 2 are circuit diagrams showing modifications of improved "saw-tooth" wave form generators in accordance with the invention.

Referring now to Fig. 1, a condenser 1 has connected in shunt therewith a charging path comprising a source of direct voltage 2 in series with an adjustable resistance 3 of a sufficiently high value to assure charging of condenser 1 at a substantially constant rate, and such as to deflect a scanning beam linearly with time to form the trace of a scanned image as described in copending application Serial No. 747,068 referred to.

Also arranged in shunt to condenser 1 is a discharge path containing the space path of a space discharge device, such as a vacuum tube 4, having a cathode 5, an anode 6, and a control grid 7. A resistance 8, connected in series with the space path of tube 4, serves to couple the output of this tube resistively to the input of a second space discharge device, such as a vacuum tube 9, likewise provided with a cathode 10, anode 11 and a control grid 12. The voltage across resistance 8 is applied through potentiometer 13, blocking condenser 14 and leak resistor 15, between the grid 12 and grounded cathode 10 of tube 9. Resistor 15 serves in conjunction with blocking condenser 14 to establish an appropriate biasing potential on the grid 12.

Tube 9 develops an output voltage across a resistor 16 connected between anode 11 and ground through battery 2. The voltage across resistor 16 is regeneratively applied to the input or grid circuit of tube 4 over a lead 17 connecting anode 11 of tube 9 to the grid 7 of tube 4.

A synchronizing voltage 20, grounded at its lower terminal, is impressed through a condenser 21, across potentiometer 13 and resistance 8 in series. The portion of the voltage developed across resistor 8 and a portion of potentiometer 13 depending on the slider setting, is thus impressed on the input or grid circuit of tube 9.

The voltage developed across condenser 1 is applied through a resistor 104 and blocking condenser 22, between output terminals 23 bridged by a resistor 24.

With the circuit constants properly adjusted and related as described in said application Serial No. 747,068, the circuit of Fig. 1 will generate voltage of "saw-tooth" wave form as follows: Assuming condenser 1 to be initially discharged, it will start to charge up at a substantially constant current rate in the manner explained. The increasing voltage thus developed across the condenser terminals will reach a value such that space current will flow through tube 4 to produce a voltage drop across resistor 8. This swings the grid of tube 9 increasingly negative, thereby decreasing the flow of space current in tube 9 and the voltage drop across its output resistor 16, in consequence of which the grid 7 of tube 4 swings increasingly positive. This positive grid swing of tube 4 decreases its space path resistance to the extent of substantially short-circuiting condenser 1, whereupon the condenser discharges so rapidly, that the rate of charge through resistor 3 is negligible by comparison.

As condenser 1 discharges, the current through the space path of tube 4 and hence the voltage across resistor 8 decreases, causing the grid of tube 9 to swing increasingly positive. The resulting increase of space current through tube 9 by increasing the voltage across its output resistor 16, swings the grid of tube 4 increasingly negative and beyond the space current cutoff of tube 4, whereby the space path impedance of the tube approximates an open circuit condition. Condenser 1 thereupon charges up again from source 2 to produce continuous repetition of the cycle of operations described.

The relatively low and substantially constant rate of charge of condenser 1 combined with its abrupt and relatively high rate of discharge develops between output terminals 23 a voltage of saw-tooth wave form, which when utilized to deflect a scanning beam produces a substantially linear picture trace of the beam across the scanning field and a rapid retrace in preparation for succeeding trace, such as is described and illustrated in mentioned application Ser. No. 747,068.

The rate of discharge of condenser 1 is controlled by the position of the slider on potentiometer 13, the setting of which determines the voltage impressed on the grid of tube 9 and hence that regeneratively impressed on the grid of tube 4.

In the absence of the synchronous control voltage 20, the periodicity of the generated wave is determined by the adjustment of resistor 3 which thus serves as the normal frequency control. If the periodicity as thus established is sufficiently close to that of the synchronizing voltage, the generator periodicity will be pulled into step with the synchronizing voltage and maintained so. This tendency to "pull into step" depends on the relative amplitudes of the feedback voltage and the synchronizing voltage. The potentiometer 13 provides an effective, smooth and positive, continuously adjustable control for this purpose in that it simultaneously adjusts oppositely both the synchronizing voltage applied to the generator and the amplitude of the feedback voltage. Thus, as the slider of potentiometer 13 is moved to the right, the synchronizing voltage impressed on the grid of tube 9 is increased. At the same time, however, the increase in resistance of that part of the potentiometer thus introduced between the plate of tube 4 and the grid of tube 9 reduces the fraction of the generated wave voltage developed across resistor 8 which is impressed between the grid and cathode of tube 9. Thus, by the simple expedient of adjusting the potentiometer slider, the impressed synchronizing and feedback voltages are oppositely adjusted to such relative amplitudes as will assure maintenance of synchronism.

Since the potential applied by tube 4 to the grid of tube 9 is of impulse form poled with the peaks negative relative to ground, it is preferable, when the synchronizing voltage supplied from source 20 is also of impulse form, to pole that voltage so that its peaks are negative relative to ground.

Figure 2:
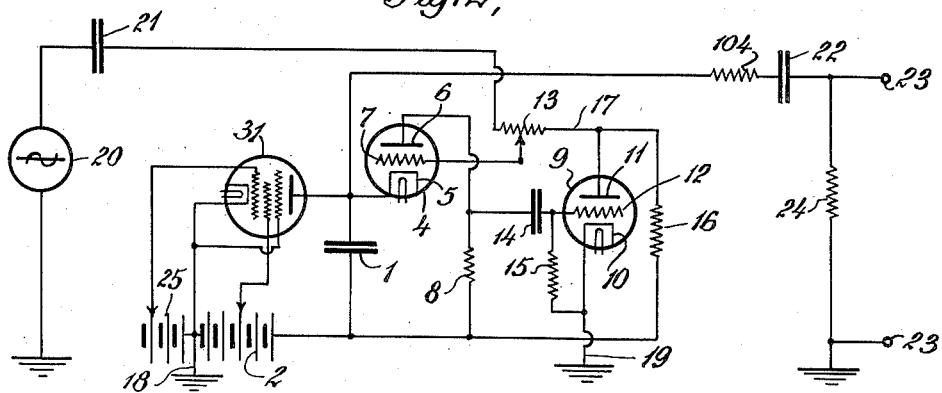

The Fig. 2 circuit requires no detailed explanation because it is generally like that of the Fig. 1 circuit, like elements being similarly designated. The principal modification of the Fig. 2 circuit as compared to that of Fig. 1 resides in removal of the potentiometer 13 from the anode 6, grid 12 connection of Fig. 1, and its introduction in the anode 11, grid 7 connection of Fig. 2. With the latter arrangement the synchronizing voltage is applied to the grid circuit of the short-circuiting tube 4, and an adjustable portion of the potentiometer is included in the regenerative feedback connection 17. As with the previous arrangement, however, movement of the potentiometer slider adjusts oppositely the synchronizing voltage applied to the generator and the amplitude of feedback. As the slider is moved to the left, for example, the synchronizing voltage impressed on the grid circuit of tube 4 is increased, while simultaneously the feedback is decreased due to increasing resistance thus introduced into the feedback connection 17.

The charging resistance 3 of the Fig. 1 circuit is replaced in Fig. 2 by a multi-grid vacuum tube 31 adjusted to provide a substantially constant space current for the range of voltage variation produced by the generated wave. The inner grid of this tube is variably tapped to a source 25 of negative biasing potential which serves to adjust the periodicity of the generated wave in the absence of the synchronizing voltage.

Due to the fact that in the Fig. 2 circuit the synchronizing voltage is directly applied to the grid of the short-circuiting tube 4, in contrast to its application to the grid of the feedback tube 9 as in Fig. 1, it will be preferable, when the voltage wave form of generator 20 is of impulse form, to pole this voltage so that the peaks are positive relative to ground at the grid of tube 4.

Figure 3:
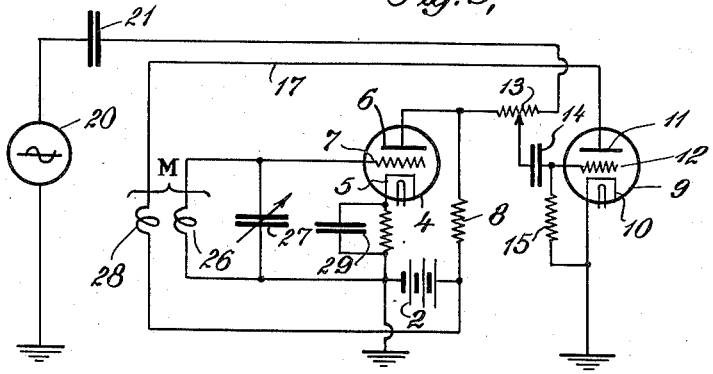
Fig. 3 is a circuit diagram of a vacuum tube generator of substantially sinusoidal waves employing synchronizing feedback control in accordance with the invention.

Fig. 3 illustrates an application of the synchronous control arrangement of the present invention to a tuned regenerative vacuum tube system adapted to produce waves of substantially sinusoidal form. The system employs a pair of vacuum tubes 4 and 9 and an intertube resistive coupling system identical in circuit arrangement with that of Fig. 1 for adjustably coupling through potentiometer 13, the output of tube 4 to the input of tube 9. A synchronizing voltage from source 20 is applied, as in Fig. 1, through a condenser 21 to the potentiometer 13.

Tube 4 is provided with a tunable input consisting of a coil 26 shunted by a variable condenser 27 for setting the generated frequency in the absence of the synchronizing voltage 20. The anode 11 of tube 9 is returned to ground over lead 17 and through coil 28 inductively coupled by mutual inductance M to coil 26. The magnetic poling of coils 26 and 28 is such as in effect to couple the output of tube 9 regeneratively to the input of tube 4, thereby to establish sustained oscillations of a frequency determined primarily by the tuning of circuit 26, 27. The control grid 7 of tube 4 is suitably biased by a series cathode resistance and by-pass capacity combination 29 interposed between cathde 5 and ground.

Synchronization of the Fig. 3 generator is secured in a manner analogous to that of Fig. 1. Adjustment to the right of the slider of potentiometer 13 increases the synchronizing voltage applied to the grid circuit of tube 9, and simultaneously decreases the feedback voltage amplitude by reducing the coupling between plate 6 and grid 12 in the manner explained.

Fig. 4 shows sufficient of the circuit diagram of a superheterodyne television receiving system to illustrate application of synchronized generators in accordance with the present invention to deflection of the cathode ray of a cathode ray tube for scanning, as is described more fully in our mentioned application Ser. No. 747,068.

The antenna 34, 35 is appropriately connected to the reception frequency portion of the system which, together with the oscillator-modulator elements and all but the final intermediate frequency stages are indicated schematically by the single rectangle 36, as being of a known construction not immediately related to the present invention.

Tube 37, which is the final stage of intermediate frequency amplification, has its output coupled through an intermediate frequency bandpass filter 38 to the diode section of a combined diode detector and amplifier tube 39. The intermediate frequency band transmitted by 38 thus effectively applied to the diode section of tube 39 is thereby rectified to develop the modulation frequencies, which are in turn applied by the low pass filter 40 between the control grid and cathode in the amplifier section of tube 39, and thus reproduced in greater amplitude and opposite poling across the low pass filter 41 in the output of tube 39.

The modulating frequencies developed across the output of filter 41 comprise the vision frequencies of the image to be reproduced, together with both line-scanning and picture-scanning synchronizing impulses. Generation, combination, modulation and transmission of this composite modulating wave band may be effected in the manner described in the said application Ser. No. 747,070.

The voltage developed across the output of filter 41 is supplied to the control grids of three output tubes 42, 43 and 44. Tube 42 develops the complete, undistorted voltage of filter 41, amplified and oppositely poled, across the output filter 45. The output of filter 45 thus includes the vision frequencies representing the picture detail, and impulse peaks marking the frame of the scene, this output voltage being so poled that black in the scene and the frame is here represented by negative voltage peaks.

The input circuit to tube 43 includes a capacity, resistance branch 46, 47, and the output circuit 48 of this tube includes a similar branch 49, 50. The voltage utilized for the input is that across resistance 47, and the output which is utilized is that developed across resistance 49. Due to each of these branches, the arrangement discriminates against the lower modulating frequencies and develops the higher modulating frequencies. Thus, this circuit reduces the amplitude of the picture impulse components and develops the line frequency impulses to provide a source of line synchronizing impulses poles to have negative peaks.

The input circuit to tube 44 includes a resistance-capacity branch 51, 52 and the output circuit 53 includes a similar branch 54, 55. Here the voltage utilized for the input is that across capacity 52, and the output voltage which is utilized is that developed across capacity 55. The arrangement thus discriminates against the higher modulating frequencies and develops the lower frequencies. Thus this circuit reduces the amplitude of the line impulses and develops the picture frequency impulses to provide a source of picture synchronizing impulses poled to have negative peaks.

The remainder of the Fig. 4 system, which is to be controlled by the three output voltages developed across filters 45, 48 and 53, comprises a cathode ray projector tube 56, high and low voltage power supplies 57 and 105 respectively, arranged to be operated from the house alternating current mains, and two generator sections 59 and 60—one for producing the line and the other for producing the picture-scanning frequencies of saw-toothed wave form. Each of these sections is generally similar to the generator of Fig. 1.

The cathode ray tube 56, providing a picture on its fluorescent screen, is here shown to be of the electrostatic focus type having a heater 61, cathode 62, control grid 63, screen-grid 64, a first focusing anode 65, and second anode 66. A high voltage power supply of the voltage doubling type, including rectifiers 67, 68 and condensers 69, 70, develops direct-current voltage across the divider 71, from which appropriate direct-current voltages are led to the mentioned electrodes of the cathode ray tube 56. Potentiometer 72 permits manual setting of the voltage on the first anode to adjust the focus of the ray and potentiometer 73 permits a negative bias control of grid 63 to set the background illumination. The output of filter 45 is applied over conductor 74 and through condenser 75 to the control grid 63 of the cathode ray tube.

The low voltage power supply, which provides direct-current potentials to the tubes of the two generators 59 and 60, includes a rectifier 80 and a filter 81.

The essential elements of the generators are as follows: For the line frequency scanning, a capacity comprising condensers 82 and 83 in series is charged rapidly from the direct voltage source 105 through tube 85 and periodically discharged linearly with time by the tube 84 arranged for constant space current. The synchronizing impulses at line frequency, developed at output of filter 48, are applied by means of potentiometer 86 to the input of the reversing tube 87. Potentiometer 86 (like potentiometer 13 in Fig. 1) is adjustable to increase the synchronizing voltage at the grid of tube 87 and simultaneously to decrease the regeneration of generator 59 by reducing the coupling between tubes 85 and 87.

The uncontrolled frequency generated by this circuit is adjusted independently of the synchronizing voltage approximately to the required line frequency, by setting the constant current discharging rate in tube 85 by adjustment of bias resistor 88, and then, by adjustment of potentiometer 86, the operation is made synchronous with that of the line frequency output of filter 48.

The current through condensers 82 and 83 is of impulse form and the voltage across condenser 83 and resistor 89 is of saw-tooth-plus-impulse wave form. This voltage is applied to the signal control grid of an amplifier tube 90 in amplitude set by potentiometer 91 to provide current of saw-tooth wave form in scanning coils 92, 93 which control the scanning at line frequency of the cathode ray of tube 56.

Similarly, the picture frequency scanning generator comprises capacity 94, discharged linearly with time through the constant current tube 95 and charged rapidly by tube 96 regenerated by reversing tube 97. The values of capacity and constant current determine the uncontrolled frequency which is generated. Here the constant current discharging rate is set by variable resistor 98 to establish the generated frequency at approximately the required picture frequency rate. Synchronous control with the picture frequency impulse output of filter 53 is secured by applying the output of 53 to the input of tube 97 through potentiometer 99, and utilizing potentiometer 99 to vary the synchronizing voltage on the grid of 97 oppositely to the feedback coupling between tubes 96 and 97. The saw-tooth voltage developed across condenser 94 is applied to the control grid of tube 100 in amplitude set by potentiometer 101 to provide current of saw-tooth wave form in the picture scanning coils 102 and 103 of the cathode ray tube 56.

The synchronizing control secured by adjustment of potentiometers 86 and 99 is smooth and precise. Where, however, the receiver is equipped with automatic gain control such as to assure a constant level of output for filters 48 and 53, irrespective of fluctuations in intensity of the received signals, it will be unnecessary to readjust potentiometers 86 and 99 each time a station is "tuned in". Hence these potentiometers may be set by the manufacturer of the receiver and may be left for adjustment by the service man, or each may be set permanently at the most favorable adjustment by substituting properly designed voltage dividers for the variable potentiometers shown.

It will be noted that the synchronizing impulses as applied to tubes 43 and 44 were specified to be poled with the peaks negative relative to ground. This is the condition for most effective control of the generator circuits.

The circuit of Fig. 1 having electrical constants as given below, has been employed for generating saw-tooth voltage having a fundamental frequency of about 3,000 cycles per second used for line frequency scanning in a television receiver:

| Element as designated in Fig. 1 | Electrical magnitude |
|---|---|
| 1 | =0.01 μf. |
| 2 | =600 volts. |
| 3 | =1.0 megohm (variable). |
| 4 | =Type '56 tube (shorting tube). |
| 8 | =500 ohms. |
| 9 | =Type '56 tube (feed-back tube). |
| 13 | =0.1 megohm (potentiometer). |
| 14 | =0.002 μf. |
| 15 | =1.0 megohm. |
| 16 | =0.1 megohm. |
| 17 | =Direct connection (9 to 7). |
| 20 | =Synchronizing signal generator (for line frequency of, say, 2880 cycles per second). |
| 21 | =0.01 μf. |
| 104 | =1.0 megohm. |
| 22 | =0.02 μf. |
| 23 | =Output saw-tooth voltage wave (2880 cycles per second). |
| 24 | =1.0 megohm. |

I claim:

1. A regenerative vacuum tube electric wave generator, a control circuit for said generator adapted to be energized by a source of synchronizing voltage, and means for simultaneously adjusting the synchronizing voltage applied by said control circuit and the regeneration in said generator in opposite senses.

2. In an electric wave generator: a vacuum tube having input and output circuits, means adjustably coupling the output of said tube regeneratively to its input, a control circuit for said generator adapted to be energized by a source of synchronizing voltage, means adjustably coupling said synchronizing control circuit to said input circuit to effect synchronism, and means for simultaneously adjusting said regenerative and synchronizing couplings oppositely.

3. In an electric wave generator: at least a pair of vacuum tubes, means for adjustably coupling said tubes in feedback relation, a control circuit for said generator adapted to be energized by a source of synchronizing voltage, and means simultaneously for adjusting the synchronizing voltage applied by said control circuit and the effectiveness of said feedback coupling in opposite senses.

4. In an electric wave generator: a first and a second vacuum tube, each having input and output circuits, means coupling the output of each of said tubes to the input of the other, one of said coupling means being adjustable, a control circuit for said generator adapted to be energized by a source of synchronizing voltage, means adjustably coupling said synchronizing control circuit to the input of one of said tubes, and means for simultaneously effecting adjustments of said adjustable couplings in opposite senses.

5. In an electric wave generator: a first and a second vacuum tube, each having input and output circuits, means adjustably coupling the output of the first tube to the input of the second, means coupling the output of the second tube to the input of the first, a control circuit for said generator adapted to be energized by a source of synchronizing voltage, means adjustably coupling said synchronizing control circuit to the input of the second tube, and means simultaneously effecting adjustments of said adjustable couplings in opposite senses.

6. In an electric wave generator: a first and a second vacuum tube, each having input and output circuits, means coupling the output of the first tube to the input of the second, means regeneratively coupling the output of the second tube to the input of the first tube, a control circuit for said generator adapted to be energized by a source of synchronizing voltage, means adjustably coupling said synchronizing control circuit to the input of one of said tubes, and means for simultaneously adjusting said synchronizing coupling in inverse relation to adjustment of one of said intertube couplings.

7. In an electric wave generator: a first and a second vacuum tube, each having input and output circuits, means coupling the output of the first tube to the input of the second, means adjustably coupling the output of the second tube regeneratively to the input of the first tube, a control circuit for said generator adapted to be energized by a source of synchronizing voltage, means adjustably coupling said synchronizing control circuit to the input of the first tube, and means simultaneously effecting adjustments of said regenerative and synchronizing couplings in opposite senses.

8. In an electric wave generator: a condenser, a direct voltage source, means for charging said condenser from said source, and means for effecting periodic discharge of said condenser comprising, a first and a second vacuum tube, each having input and output circuits, means connecting said condenser in the output circuit of one of said tubes, means coupling the output of each of said tubes to the input of the other, one of said coupling means being adjustable, a control circuit for said generator adapted to be energized by a source of synchronizing voltage, means adjustably coupling said synchronizing control circuit to the input of one of said tubes, and means for simultaneously effecting adjustments of said adjustable couplings in opposite senses.

9. In an electric wave generator: a condenser, a direct voltage source, means for charging said condenser from said source, and means for effecting periodic discharge of said condenser, comprising, a first and a second vacuum tube, each having input and output circuits, means connecting said condenser in the output circuit of the first tube, means adjustably coupling the output of the first tube to the input of the second, means for coupling the output of the second tube to the input of the first, a control circuit for said generator adapted to be energized by a source of synchonizing voltage, means adjustably coupling said synchronizing control circuit to the input of the second tube, and means simultaneously effecting adjustments of said adustable couplings in opposite senses.

10. In an electric wave generator: a condenser, a direct voltage source, means for charging said condenser from said source, and means for effecting periodic discharge of said condenser comprising, a first and a second vacuum tube, each having input and output circuits, means connecting said condenser in the output circuit of the first tube, means coupling the output of the first tube to the input of the second, means regeneratively coupling the output of the second tube to the input of the first, a control circuit for said generator adapted to be energized by a source of synchronizing voltage, means adjustably coupling said synchronizing control circuit to the input of one of said tubes, and means for simultaneously adjusting said synchronizing coupling in inverse relation to adjustment of one of said intertube couplings.

11. In an electric wave generator: a condenser, a direct voltage source, means for charging said condenser from said source, and means for effecting periodic discharge of said condenser, comprising, a first and a second vacuum tube, each having input and output circuits, means connecting said condenser in the output circuit of the first tube, means coupling the output of the first tube to the input of the second, means adjustably coupling the output of the second tube regeneratively to the input of the first, a control circuit for said generator adapted to be energized by a source of synchronizing voltage, means adjustably coupling said synchronizing control circuit to the input of the first tube, and means simultaneously effecting adjustments of said regenerative and synchronizing couplings in opposite senses.

12. An electric wave generator comprising: a source of direct voltage, a condenser, means for charging said condenser from said source at a substantially constant rate, and means for effecting periodic discharge of said condenser comprising a pair of vacuum tubes having control grids, said condenser being connected in the space path of one of said tubes, coupling means responsive to the flow of space current in each of said tubes for controlling the grid potential of the other, one of said coupling means including at least a portion of an adjustable voltage divider, and a control circuit for said generator adapted to be energized by a source of synchronizing voltage and coupled to said voltage divider, whereby adjustment of said voltage divider adjusts the synchronizing voltage applied to the respective coupling circuit and the regenerative potential transferred thereby in opposite senses.

HAROLD M. LEWIS.